United States Patent
Malinin et al.

(10) Patent No.: US 10,030,546 B2
(45) Date of Patent: Jul. 24, 2018

(54) ARRANGEMENT AND METHOD UTILIZING WASTE HEAT

(71) Applicant: Siemens Aktiengesellschaft, Munich (DE)

(72) Inventors: Vitaly Malinin, Moscow (RU); Viacheslav Schuchkin, Moscow (RU)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/024,992

(22) PCT Filed: Sep. 25, 2013

(86) PCT No.: PCT/RU2013/000832
§ 371 (c)(1),
(2) Date: Mar. 25, 2016

(87) PCT Pub. No.: WO2015/047119
PCT Pub. Date: Apr. 2, 2015

(65) Prior Publication Data
US 2016/0237860 A1 Aug. 18, 2016

(51) Int. Cl.
*F01K 25/10* (2006.01)
*F01K 3/18* (2006.01)
*F01D 15/10* (2006.01)
*H02K 7/18* (2006.01)

(52) U.S. Cl.
CPC ............ *F01K 25/103* (2013.01); *F01D 15/10* (2013.01); *F01K 3/185* (2013.01); *H02K 7/1823* (2013.01)

(58) Field of Classification Search
CPC .......... F01K 3/185; F01K 15/00; F01K 23/04; F01K 25/103
See application file for complete search history.

(56) References Cited

U.S. PATENT DOCUMENTS

| 4,052,260 A * | 10/1977 | Forster | G21D 5/06 376/394 |
| 2012/0131918 A1 | 5/2012 | Held | |
| 2012/0131921 A1* | 5/2012 | Held | F01K 25/08 60/671 |

FOREIGN PATENT DOCUMENTS

WO  WO/2013/115668  8/2013

* cited by examiner

*Primary Examiner* — Audrey K Bradley
(74) *Attorney, Agent, or Firm* — Cozen O'Connor

(57) ABSTRACT

A method and arrangement for utilizing waste heat that includes a waste heat exchanger, at least two turbines, at least two recuperators, at least two cooler units, and at least two pumps and/or compressors as components, wherein all components are arranged in a single fluid cycle, where the waste heat exchanger heats up a fluid with heat from a waste heat source, the heated fluid flows through a first set of the at least one turbine, the at least one recuperator, the at least one cooler unit, and the at least one pump and/or compressor, and then flows through at least a second set the at least one turbine, the at least one recuperator, the at least one cooler unit, and the at least one pump and/or compressor with the same components arranged in series downstream of the first set.

22 Claims, 6 Drawing Sheets

-- PRIOR ART --

-- PRIOR ART --

ARRANGEMENT AND METHOD UTILIZING WASTE HEAT

CROSS-REFERENCE TO RELATED APPLICATIONS

This is a U.S. national stage of application No. PCT/RU2013/000832 filed 25 Sep. 2013.

BACKGROUND OF THE INVENTION

1. Field of the Invention

The present invention relates to an arrangement and method for utilizating waste heat comprising a waste heat exchanger, at least two turbines, at least two regenerators, at least two cooler units, and at least two pumps and/or compressors as components, where the waste heat exchanger heats up a fluid with heat from a waste heat source, and the heated fluid flows through a first set of the at least one turbine, the at least one recuperator, the at least one cooler unit, and the at least one pump and/or compressor.

2. Description of the Related Art

Organic Rankine Cycles (ORC) are used to utilize waste heat, for example, from power generation, technological processes in metal manufacturing, glass production, chemical industry, from compressors, or internal combustion engines. Conventional ORC technology is only able to use a certain amount of waste heat due to the limited thermal stability of organic fluids. It limits the thermal efficiency of ORC systems if heat source temperature exceeds 250 to 300° C. On average, the total efficiency of conventional ORC units do not exceed values of 10%. 90% of thermal energy is wasted to the atmosphere.

In very compact systems, the use of Supercritical $CO_2$ (S—$CO_2$) cycles allows the utilization or waste heat with an efficiency of up to 20%. The size of the system is half of that using standard ORC technology, which permits its use to utilize waste heat from different heat sources.

Substantially there are two basic conventional system layouts for S—$CO_2$ cycles, i.e., regenerative and non-regenerative. The two cycle systems differ from each other by the presence or absence of intermediate heating of cycle fluid by expanded fluid downstream the turbine in recuperators. Both system layouts are used to utilize heat from sources with low power and temperature level with help of ORC and S—$CO_2$ cycles.

The internal thermal efficiency of regenerative cycles is almost twice as high as the efficiency of non-regenerative cycles. It can exceed 30% for S—$CO_2$ cycle systems. However, in real conditions of S—$CO_2$ cycle implementation net efficiency, the rate of total available thermal to electrical energy conversion, for systems with simple layouts is around 10% of available thermal energy in the range from environmental to heat source temperature. To improve the performance and achieve 20% efficiency, more complex system layouts have to be used.

S—$CO_2$ cycle implementation, depending on the environmental conditions and layout, may require both pumps for liquefied $CO_2$ flow and compressors for S—$CO_2$ gas compression. At real conditions, regenerative cycles have more than twice higher internal thermal efficiency than non-regenerative cycles and draw less thermal energy from the heat source. Even for relatively low temperatures of heat sources, temperatures at the heater outlet in regenerative cycles remain relatively high, which allows utilization of remaining thermal energy in sequentially located units.

To improve S—$CO_2$ system efficiency, a simple sequential arrangement of at least two independent S—$CO_2$ systems is possible, in series one after another within a gas flow with waste heat. In the sequential arrangement, the second S—$CO_2$ regenerative cycle utilizes the heat downstream to the first regenerative cycle providing noticeable overall higher net efficiency of the waste heat utilization arrangement.

WO2012074905A2 and WO2012074911A2, for example, disclose more complex sequential arrangements of two S—$CO_2$. The two sequentially arranged regenerative S—$CO_2$ systems in a heat utilizing unit, described in these conventional arrangements comprise in both cases one common/merged cooler. Here, the advantage is a reduction of components, because only one cooler is required. The system complexity rises and the control gets more complicated because mass flow must be internally distributed between two turbines and united in a single cooler. In WO2012074905A2, pumps are used, assuming liquefied $CO_2$ subsequently flows to the cooler. In WO2012074911A2, compressors are used, assuming a supercritical $CO_2$ gas subsequently flows to the cooler.

A further integration is achieved upon joining the heaters into a single unit, as described, for example, in WO2011119650A2 and WO2012074940A3. Both layouts of regenerative S—$CO_2$ systems comprise two expansion turbines, two regenerators but only one joint heater, one joint cooler and one pump for liquid $CO_2$ flow. Here, less components than in the previously-described systems are provided, but they require more complex flow management. Two flow streams are joined at one point of the system and re-split to separate streams at another point of the system at an upstream location.

In WO2011119650A2, the flow stream is split up after a pump, and one flow portion is directly forwarded to a waste heat exchanger. In WO2012074940A3, before the split, the flow passes through a regenerator placed downstream the pump and only after that does the flow portion enter the waste heat exchanger.

The above-described different layouts of S—$CO_2$ system arrangements differ in thermodynamic processes, exhibit different efficiencies, comprise different hardware components, and demand different system mass flow management and control, requirements. A reduction of components requires an increased effort for mass flow-management and control. Savings from components lead to increased costs for control and higher complexity with potentially increased error rates.

SUMMARY OF THE INVENTION

In view of the foregoing, it is therefore an object of the present invention to provide an arrangement and method for utilizing waste heat with a high level of efficiency, which particularly can be used to utilize little amounts of waste heat at only slightly higher temperatures than in the environment. A further object of the arrangement and method in accordance with the present invention is to provide a simple, cost effective way to utilize waste heat, with a more simple arrangement.

These and other objects and advantages are achieved in accordance with the invention by providing an arrangement for utilizating waste heat which comprises only one waste heat exchanger, at least two turbines, at least two regenerators, at least two cooler units, and at least two pumps and/or compressors as components, whereall components are arranged in a single fluid cycle, particularly in series one after another.

The simplest way to increase the amount of waste heat utilized, and to increase the effectiveness of the system is to use two independent arrangements for the utilization of waste heat, with waste heat exchangers located just one behind another within the hot exhaust emanating from a waste heat source. Waste heat sources are, for example, turbines, engines such as electrical motors, and/or processes in the chemical industry.

Normally, the waste heat exchanger is the largest and most expensive part of an arrangement for the utilization of waste heat. To increase efficiency with a more simple arrangement the different fluid circuits and cycles can be merged into one single cycle in accordance with the present invention, with only one waste heat exchanger. This reduces the complexity of the system to utilize waste heat, reduces costs and can lead to a higher amount of waste heat utilized. The use of all components of the arrangement within the fluid cycle in series, one behind another within the fluid mass stream gives a simple, cost effective and easy to regulate arrangement.

The arrangement can be of the kind regenerative supercritical $CO_2$ systems, particularly with $CO_2$ as fluid within the single fluid cycle. This further enables the utilization of waste heat with high efficiency, even for exhaust with only slightly higher temperatures than in the environment.

The single fluid cycle can comprise at least two open sub-cycles, respectively with one turbine, one recuperator, one cooler unit, and one pump or compressor, particularly arranged in series one behind the other within the fluid stream, particularly with $CO_2$ as the fluid. This arrangement is like two single closed cycles one after the other within the exhaust stream, as previously described, but opened for example at the waste heat exchanger and connected together in series. The former input to the waste heat exchanger of the first working fluid cycle is connected to the output of the waste heat exchanger to the second cycle, giving an arrangement of both cycles in series. The at least two sub-cycles can respectively be regenerative supercritical $CO_2$ cycles for the utilization of waste heat. This enables the use of exhaust with a small amount of heat and only little increased temperatures compared to the environment, such as in the range of 100° C. to 200° C. or even less.

A bypass can be comprised by a sub-cycle, particularly by every sub-cycle, for optimal adjustment of mass flow of fluid within a sub-cycle. This increases the efficiency of the system and the mass flow through a sub-cycle can be adjusted to the temperature of the supercritical $CO_2$ within the cycle. The bypass can connect the output of the pump or compressor of the cycle direct with the input to the waste heat exchanger.

A bypass valve directly fluidically connecting the inflow of a sub-cycle with the inflow of the waste heat exchanger can be comprised, particularly at every sub-cycle. With this additional or alternative bypass, which can be controlled or regulated, the mass flow within a sub-cycle can be controlled or regulated or a sub-cycle can be "switched off" by the bypass, particularly depending on temperature of the supercritical $CO_2$ and/or the amount of heat within the exhaust passing through the waste heat exchanger.

The single fluid cycle can be in form of a closed fluid circuit. This gives a very effective arrangement, especially using supercritical $CO_2$ as fluid, transporting heat from the waste heat exchanger to the generators.

One, particularly every turbine, can respectively be mechanically connected to at least one generator. The amount of heat and related energy stored in the fluid, particularly supercritical $CO_2$, loaded in the waste heat exchanger to the fluid and transported by the fluid to a respective turbine, can be transformed and used in the form of mechanical energy, transferred from the turbine to the mechanically connected generator, and transformed by the connected generators from mechanical into electrical energy.

It is also an object of the invention to provide a method for utilizing waste heat, particularly using the above-described arrangement, which comprises a waste heat exchanger that heats a fluid with heat from a waste heat source, where the heated fluid flows through a first set of at least one turbine, at least one recuperator, at least one cooler unit, and at least one pump and/or compressor. The fluid then flows through at least a second set of at least one turbine, at least one recuperstor, at least one cooler unit, and at least one pump and/or compressor, arranged in series downstream to the first set.

The fluid can flow through the first set with the same amount of mass, i.e., flow stream, as through the at least second set.

Alternatively, the fluid can flow through the first set with a flow stream as through the at least second set plus the fluid flowing through a bypass.

The flow of fluid through a set downstream the first set can be controlled and/or regulated by a bypass valve, particularly fluidically connecting the inflow of the set downstream and the inflow of the waste heat exchanger, particularly in the way that no fluid passes the set downstream.

Alternatively or additionally a bypass can fluidically connect the output of the pump or compressor of one set with the output of the pump or compressor of another set and/or with the inflow of the waste heat exchanger, particularly fluidically connecting all outputs of the pumps or compressors with the inflow of the waste heat exchanger.

Fluid heated by the waste heat exchanger can flow in a closed fluid circuit through all components in series, particularly except the part of fluid flowing through a bypass.

The fluid, particularly $CO_2$ in a supercritical state, with a first temperature can be heated in the waste heat exchanger to a second temperature, and then this fluid can be transported to the turbine of the first set and cooled down to a third temperature, partially converting heat into mechanical and/or electrical energy, and it can then be heated in a recuperator of the first set until the forth temperature and then transported to the turbine of the at least second set and can be further cooled down to a fifth temperature, partially converting heat into mechanical and/or electrical energy, or it can be particularly flowed through a bypass of the at least second set.

The advantages in connection with the described method for the utilization of waste heat according to the present invention are similar to the previously, in connection with the arrangement for the utilization of waste heat described advantages and vice versa.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which.

DETAILED DESCRIPTION OF THE EXEMPLARY EMBODIMENTS

Figure 1:
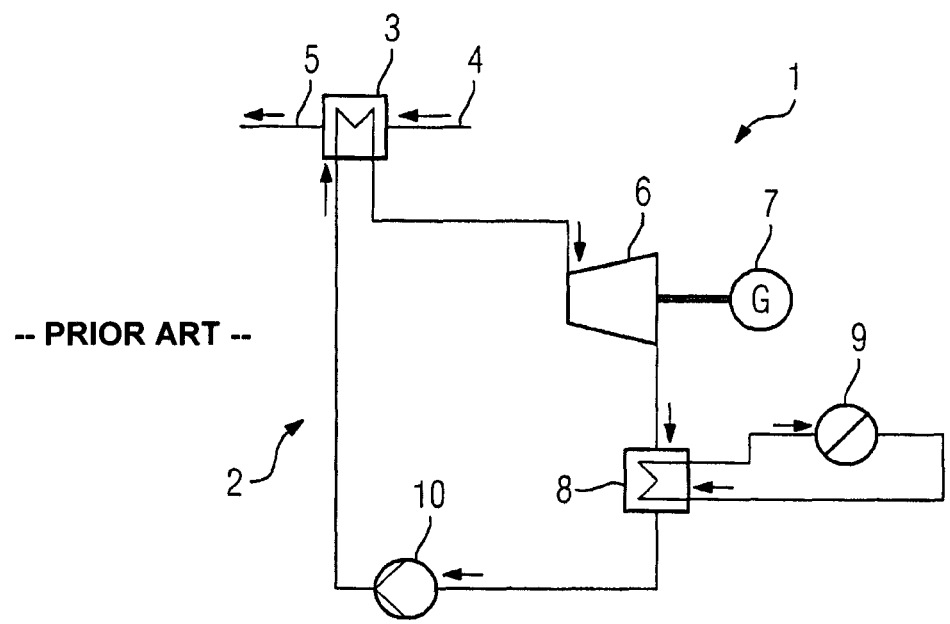
FIG. 1 illustrates a conventional non-regenerative arrangement 1 for utilizating waste heat with supercritical $CO_2$.

In FIG. 1 a conventional non-regenerative arrangement 1 for utilizating waste heat with supercritical $CO_2$ in a fluid cycle 2 is shown. Exhaust in a fluid stream of air, for example, coming from a waste heat source flows through a waste heat exchanger 3. A waste heat source is, for example, a machine or industrial process with heat production. The waste heat exchanger is comprised of the fluid cycle 2 filled, for example, with supercritical $CO_2$ as heat transporting fluid. The fluid absorbs heat from the exhaust within the heat exchanger and changes its temperature from a first temperature $T_1$ to a higher, second temperature $T_2$. The first temperature $T_1$ is, for example, room temperature and the second temperature $T_2$, is for example, in the range of 100° C. to 200° C. The second temperature can also be lower or higher, depending on the temperature of the exhaust.

The heated fluid in cycle 2 flows to a turbine 6 comprised of the cycle 2. The turbine 6 transfers thermal energy of the fluid into mechanical energy, cooling down the fluid. The turbine 6 is mechanically connected with a generator 7, which transfers the mechanical energy of the turbine 6 into electrical energy.

The fluid, coming from the turbine 6 flows through a cooler 8 thermally connected with a heat sink 9 which is, for example, a dry fan or wet tower. The cooler 8 cools the fluid further down, such as substantially to temperature $T_1$. A pump 10 in the fluid cycle 2 pumps the fluid back to the waste heat exchanger 3 and generates the fluid flow in cycle 2. Alternatively, a compressor 10 can be used instead of the pump.

Figure 2:
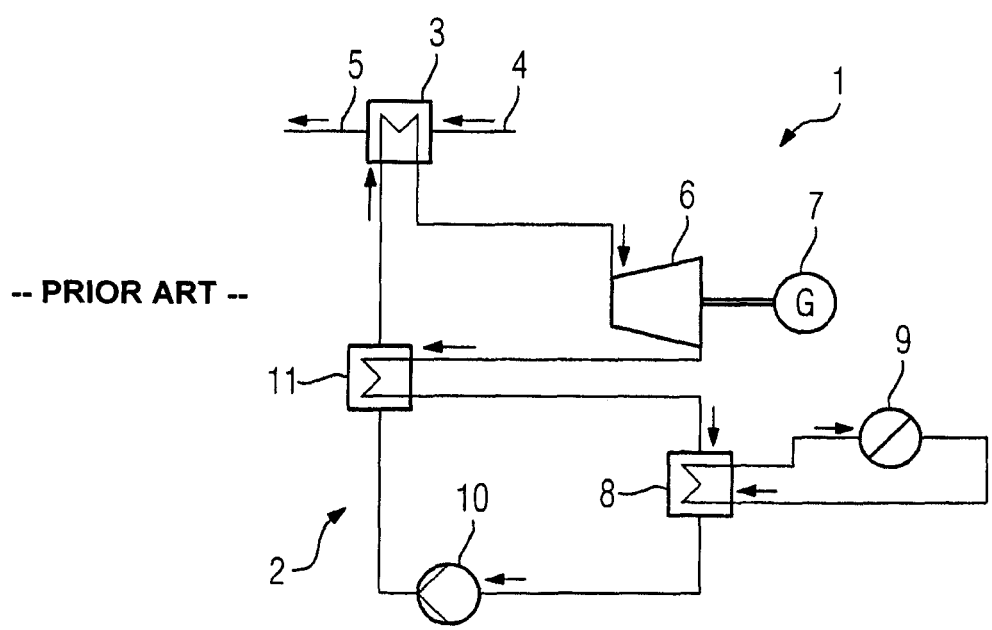
FIG. 2 illustrates a conventional regenerative arrangement 1 for utilizating waste heat with supercritical $CO_2$.

In FIG. 2 a conventional arrangement for utilizing waste heat with supercritical $CO_2$ is shown as in FIG. 1, but with merely a regenerative layout. The cycle 2 is as in FIG. 1, comprising additionally a recuperator 11. The recuperator 11 is arranged in the fluid flow between the turbine 6 and the cooler 8, in thermal connection with fluid flowing to the waste heat exchanger 3 after the pump/compressor 10. Residual heat of supercritical $CO_2$ exhausted from the turbine 6 is regenerated in the recuperator 11. The fluid-coming from pump/compressor 10 is heated within the recuperator 11.

The arrangements 1 with the closed cycle 2 of FIGS. 1 and 2 are effectively able to utilize about 10% of waste heat of the exhaust from the waste heat source. For higher efficiencies, more complex arrangements are necessary.

Figure 3:
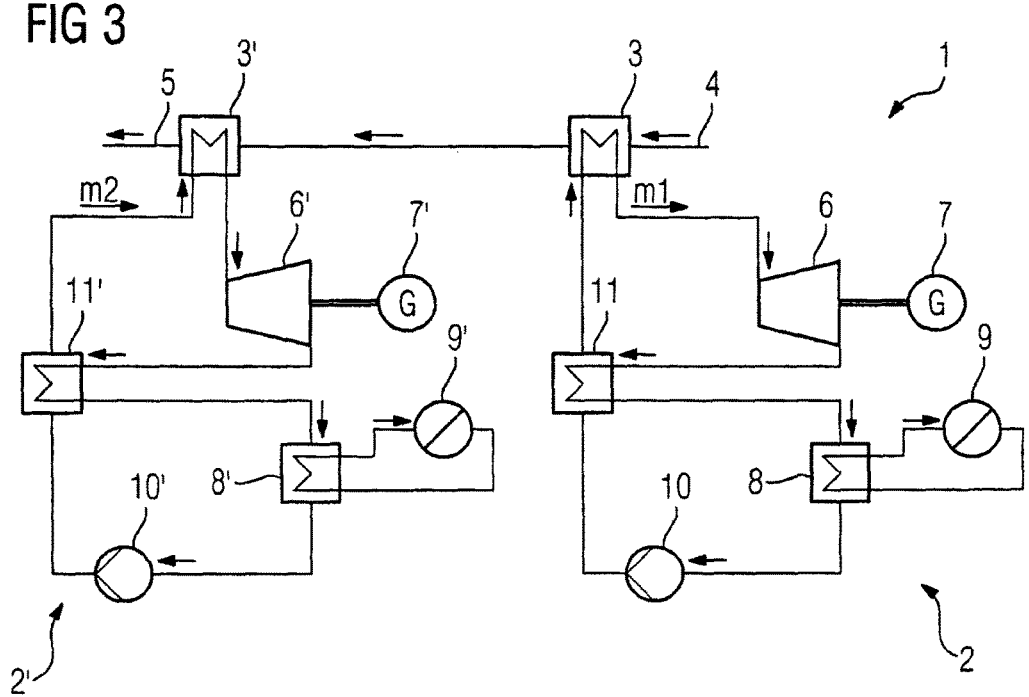
FIG. 3 illustrates a regenerative arrangement 1 for utilizating waste heat of two closed, independent cycles 2, 2' with supercritical $CO_2$, one behind the other within a stream of exhaust in accordance with the invention.

In FIG. 3 a simple arrangement of two independent waste heat utilization systems similar to the one depicted in FIG. 2 is shown, with two closed, independent cycles 2. Every cycle comprises its own waste heat exchangers 3, 3' arranged in the exhaust stream next to each other, one exchanger 3' after the other exchanger 3 in a line in the stream direction. Particularly for systems with working medium/fluid S—$CO_2$ as fluid in the cycle 2, even at lower temperatures of exhaust in the second waste heat exchanger 3', waste heat can be utilized. The system is able to effectively utilize about 20% of waste heat from the waste heat source. The disadvantage here is the high price and space that is consumed, because the waste heat exchanger 3, 3' is the most expensive and largest component of the system.

Figure 4:
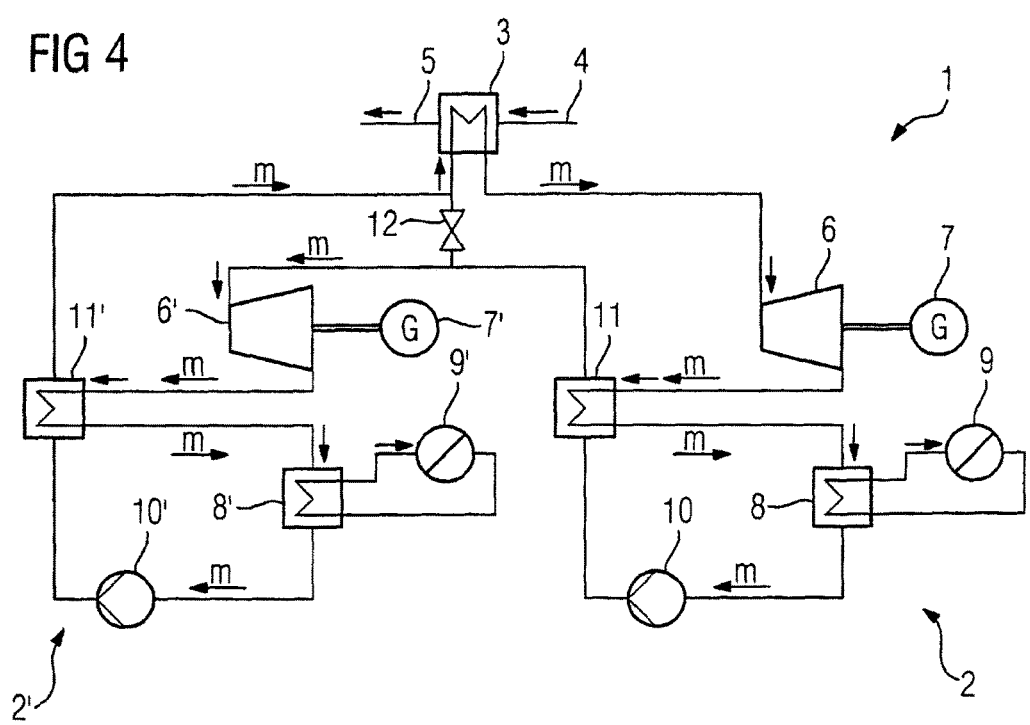
FIG. 4 illustrates a regenerative arrangement 1 in accordance with the present invention for utilizating waste heat with supercritical $CO_2$ within one single cycle 2 comprising two sequential sub-cycles.

In FIG. 4, a regenerative arrangement in accordance with the present invention for utilizing waste heat with one single cycle 2, comprising two sequential sub-cycles is shown. There is only one waste heat exchanger 3. The two exchangers 3, 3' of FIG. 3 are merged into one common exchanger 3 in FIG. 4. The components of the two closed, sequentially arranged cycles 2, 2' of FIG. 3 are arranged in FIG. 4 in one single cycle 2, with two sub-cycles one after another with serially arranged components in the cycle 2.

As shown in FIG. 4, but not necessarily comprised, a bypass valve 12 can be used to reduce or switch off the fluid flow in the second sub-cycle. Depending on the amount of waste heat and the effective rate of use in the first sub-cycle, the amount of fluid flow in the second sub-cycle can be regulated or controlled. In a normal working stage, the valve 12 is closed, and the mass flow m of fluid through the first sub-cycle is the same as in the second sub-cycle.

In an S—$CO_2$ system, which means the working fluid in the cycle 2 is $CO_2$ in a supercritical stage, a high efficiency of the waste heat utilization arrangement is reached, particularly up to 20% to 30%.

The working fluid received and stored, in the waste heat exchanger 3, an amount of heat from the exhaust, which comes from the waste heat source (not shown) in FIG. 4 for purposes of simplicity. The exhaust fluid streams into the waste heat exchanger 3 through an input in direction 4, passes by an heat exchanger unit, such as in plate or spiral form, and filled with the working fluid, which is comprised of cycle 2. The working fluid absorbs heat from the exhaust and the exhaust fluid flows out of the waste heat exchanger 3, for example, in direction to the environment, in a cooled down state.

The working fluid, coming from the waste heat exchanger 3 loaded with heat, flows to the turbine 6. The turbine 6 is mechanically connected to a generator 7. Energy, stored in the working fluid in the form of heat, which means the working fluid has a higher temperature $T_2$ than just before the waste heat exchanger with temperature $T_1$, is transformed into mechanical energy by the turbine 6 and into electrical energy by the generator 7. Normally, the turbine 6 can use substantially up to 12% of waste heat from the exhaust to produce electricity.

From the turbine 6, the working fluid flows to a recuperator 11 within cycle 2. The recuperator regenerates the working fluid and cools the fluid down at this point between turbine 6 and a cooler 8.

From the recuperator 11, the working fluid flows to a cooler 8 to be further cooled down. In general a cooler 8 is thermally connected to a heat sink 9 like a dry fan or a wet tower, building up a cooling unit. The cooler can be a heat exchanger connected via a fluid cycle to the heat sink 9. It should be understood that other cooling devices and layouts are also possible.

From the cooling device 8, the working fluid flows to a pump or compressor 10. The pump 10 pumps the fluid to keep it flowing, i.e., pushes the fluid through the cycle 2. A compressor 10 pumps the fluid to keep it flowing within the cycle 2. The effect is the same. The flow of working fluid within the cycle 2 is generated by the pump or compressor 10.

From the driven pump/compressor 10, the working fluid flows through the recuperator 11 from the first sub-cycle to the second sub-cycle. In FIG. 4, the two sub-cycles start and end at a common valve 12. The valve 12 is closed in a normal working stage of the arrangement 1. A layout without valve 12 is possible.

With closed valve 12, the same mass flow m of working fluid flowing through the first sub-cycle flows through the second sub-cycle. The working fluid, coming from the recuperator 11 flows to a second turbine 6', comprised of the second sub-cycle.

The turbine 6' is mechanically connected to a generator 7'. Energy stored in the working fluid in form of heat, which means the working fluid has a higher temperature $T_3$ than just before the waste heat exchanger $T_1$ but a lower temperature than at the turbine 6 with temperature $T_2$, is transformed into mechanical energy by the turbine 6' and into electrical energy by the generator 7'. Normally, the single turbine 6' generator 7' pair can use up to 8% of waste heat from the exhaust to produce electricity. Due to the use of S—$CO_2$, the efficiency of 8% is also possible at lower temperatures near the temperature of the environment. Lower temperature within this context can be around 100 to 200° C. above the temperature of the environment, the "so-called" room temperature. The turbine 6' is able to utilize the remaining part of the heat from the exhaust stored in the working fluid after utilization of a part of heat by turbine 6.

From the turbine 6', the working fluid flows to a second recuperator 11' within cycle 2. The recuperator 11' regenerates the heat of working fluid coming from turbine 6'. Its principal function is analogous to that of recuperator 11. The recuperator 11' cools down the working fluid between turbine 6' and cooler 8', heating up working fluid coming from the pump/compressor 10' to substantially a temperature Ti of working fluid just before the waste heat exchanger 3.

The working fluid flows from the recuperator 11' to a cooler 8' to be further cooled down. The cooler is composed similarly to the cooler 8, or two different cooler types 8 and 8' can be used, depending on the amount of heat to be removed from the working fluid.

The working fluid flows from the cooling device 8' to a further pump or compressor 10'. The pump 10' or compressor 10' generates the flow of working fluid within the second sub-cycle, i.e., reinforcing the flow of working fluid within the cycle 2.

From the driven pump/compressor 10', the working fluid flows through the recuperator 11' from the second sub-cycle to the waste heat exchanger 3. The recuperator 11' heats the working fluid coming from the pump/compressor 10' and flowing to the input of the waste heat exchanger 3. In FIG. 4, the second sub-cycle starts at the input and ends at the output of the common valve 12 of both sub-cycles. Coming from the second sub-cycle, the working fluid flows into the waste heat exchanger 3 with a temperature $T_1$, such as around room temperature, for re-heating by the exhaust. The fluid cycle 2 is a closed cycle and re-starts at the waste heat exchanger 3. In a normal working mode, with closed valve 12, the mass flow m of working fluid through the first sub-cycle is the same as the mass flow m through the second sub-cycle. With the two turbines 6 and 6' an effective part of heat can be utilized, such as about 20%.

Figure 5:
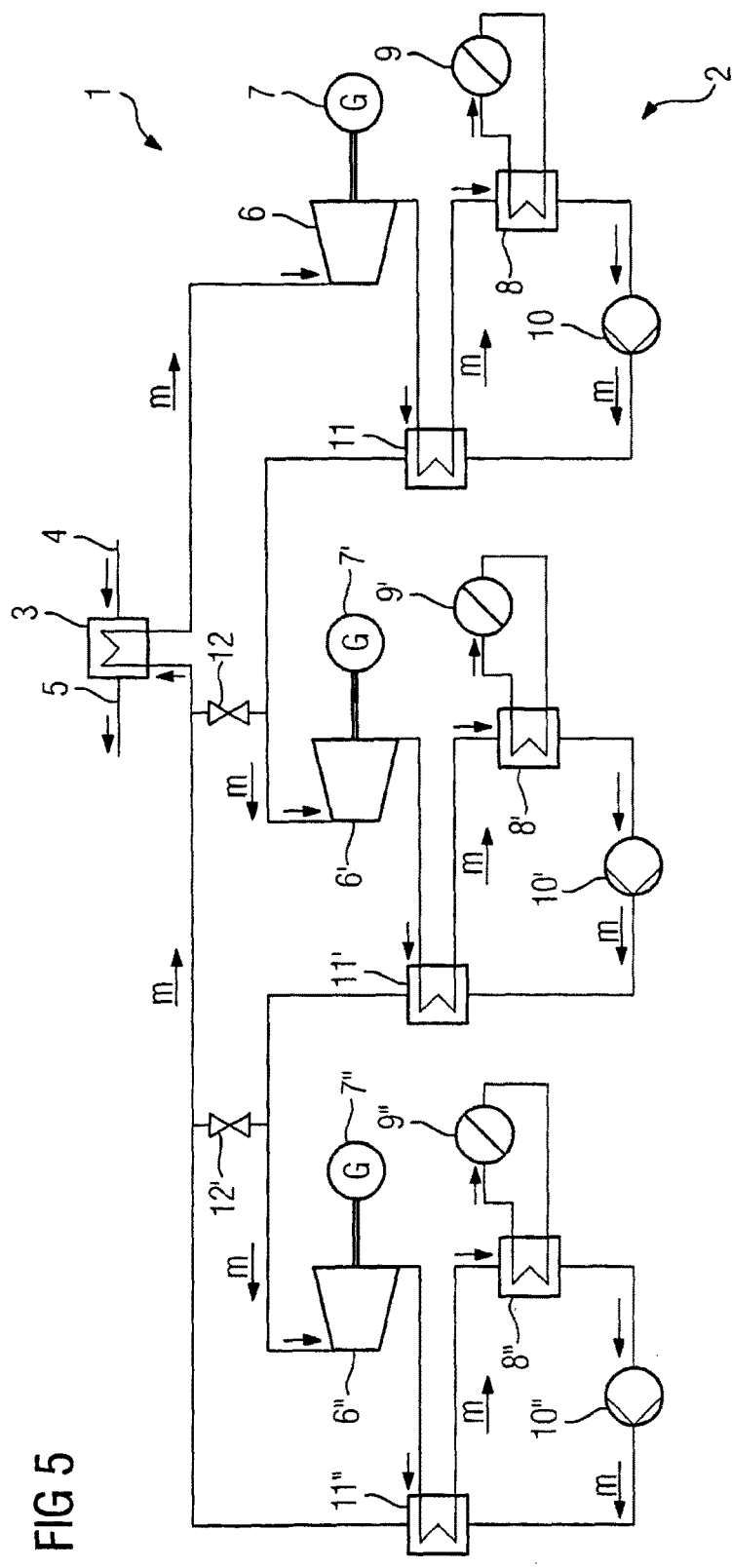
FIG. 5 illustrates the regenerative arrangement 1 of FIG. 4 comprising three sequential sub-cycles in one single cycle 2 with supercritical $CO_2$ as working fluid.

In FIG. 5, the same arrangement as in FIG. 4 is shown, but with three sub-cycles instead of two sub-cycles comprised of cycle 2 in FIG. 4. The sub-cycles start and end at a valve 12, 12'. The first sub-cycle starts at the output of the waste heat exchanger 3 and ends at the input to valve 12, the second sub-cycle starts at the input of valve 12 and ends at the input of valve 12', and the third sub-cycle starts at the input of valve 12' and ends at the output of valve 12' that is directly connected to the input of the waste heat exchanger 3. Without valves 12, 12', the sub-cycles start and end at the same connection points as shown in FIG. 5 with valves 12, 12'. The next sub-cycle always starts at the end of the former sub-cycle within the fluid stream downstream.

The principal function of the arrangement of FIG. 5 is the same as described with FIG. 4, just with three sub-cycles and hence turbines 6, 6', 6" to use waste heat with a higher efficiency. With an amount of waste heat utilized by the arrangement 1 of FIG. 4 in the range of 20%, the arrangement 1 of FIG. 5 can utilize up to 30% of waste heat of the exhaust, especially by using S—$CO_2$ as working fluid.

Figure 6:
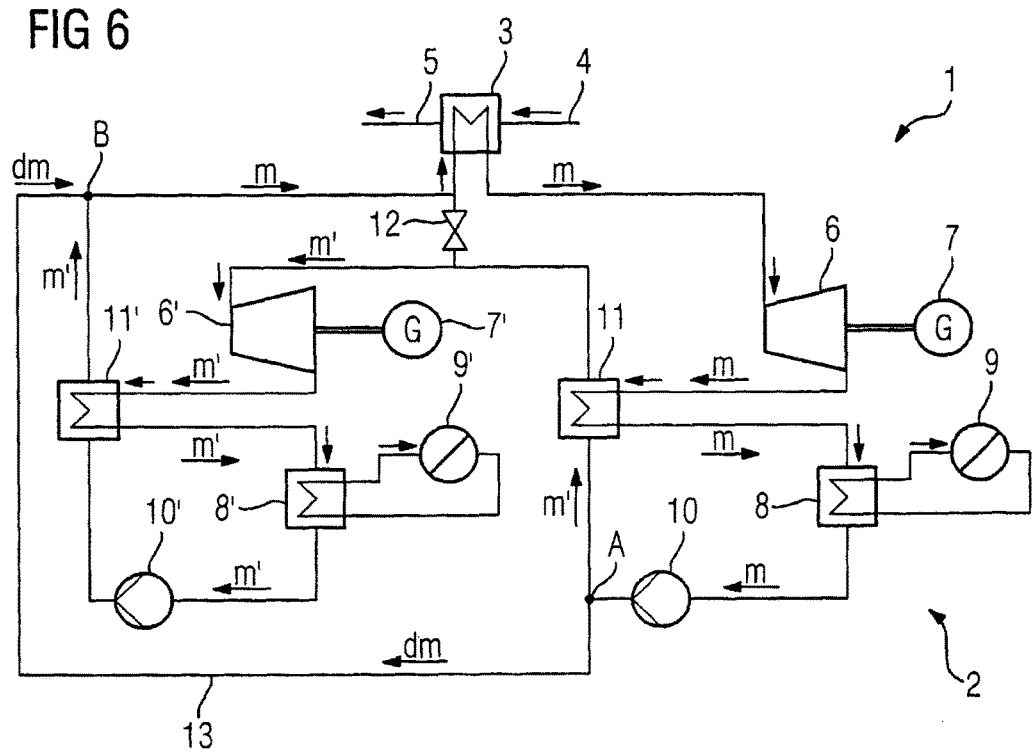
FIG. 6 illustrates the regenerative arrangement 1 of FIG. 4 with a bypass for the second sub-cycle.

In FIG. 6, the same arrangement as in FIG. 4 is shown, with an additional bypass 13. The bypass 13 starts at the output of pump 10, see point A, and ends behind the recuperator 11' downstream, i.e., at the output of valve 12 and/or the input of the waste heat exchanger 3, see point B. Depending on the amount of waste heat and the dimension of components, i.e., the amount of possible utilizations of waste heat by the sub-cycles, a bypass 13 is used to reduce the mass flow through the second sub-cycle m' by the amount of mass flow dm (reduced compared to the mass flow through the first sub-cycle m). The bypass dimension can be fixed or flow can be regulated or controlled for example by at least a valve.

Figure 7:
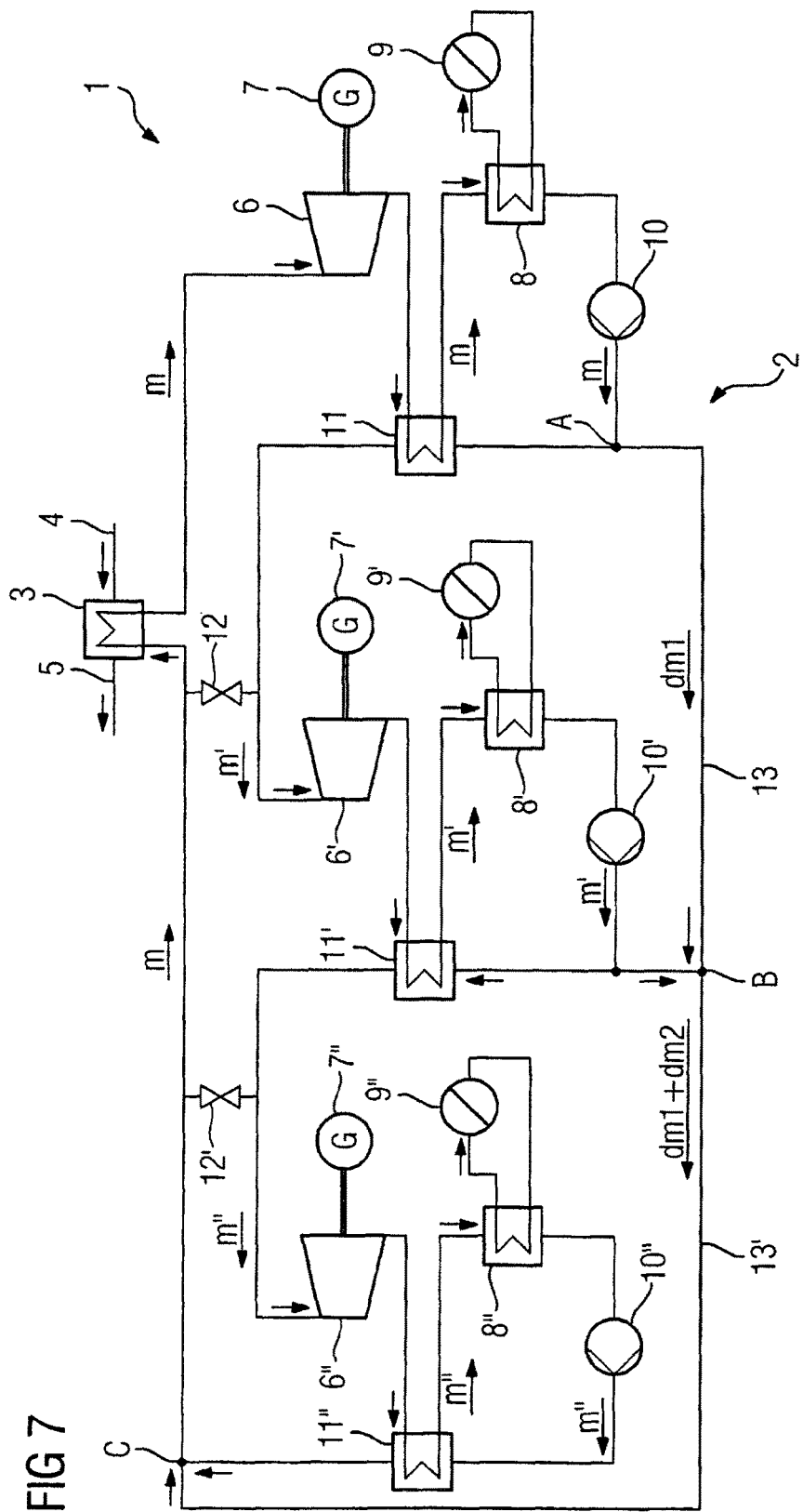
FIG. 7 illustrates the regenerative arrangement 1 of FIG. 5 with a bypass for the second and third sub-cycle respectively.

In FIG. 7 the same arrangement as in FIG. 5 is shown, with an additional bypass, comprising two sub-bypasses 13 and 13'. The bypass 13' starts at the output of pump 10', point B in FIG. 7, and ends behind the recuperator 11" downstream, i.e., at the output of valve 12' and/or the input of the waste heat exchanger 3, point C in FIG. 7. Depending on the amount of waste heat and the dimension of components, i.e., the amount of possible utilizations of waste heat by the sub-cycles, a bypass 13' is used to reduce the mass flow through the third sub-cycle m" by the amount of mass flow dm2 compared to the mass flow through the first and second sub-cycle m. A further bypass 13 is used to connect the output of pump/compressor 10, point A in FIG. 7, with the output of pump/compressor 10' and the input to bypass 13' downstream, point B in FIG. 7. Bypass 13 divides the mass flow m of the first sub-cycle into one part m' flowing through the second sub-cycle and a part dm1 flowing through the bypass 13. The bypass 13 and 13' are connected one after another serially and with the output of pump 10', see point B in FIG. 7, summing up to a common bypass to both sub-cycles, sub-cycle two and three.

The dimension of the bypasses 13 and 13' can be chosen according to the planned mass flows m, m', m" through the sub-cycles. This can depend inter alia on waste heat to be utilized by the sub-cycles, dimensions of the components, temperatures in the sub-cycles and waste heat of exhaust. The bypasses 13, 13' can also be controlled or regulated according to the desired mass flows m, m', m". The mass flow m through the first sub-cycle is the sum of the mass flow through the second sub-cycle m' and the mass flow dm1 through the bypass 13, being the sum of mass flow m" through the third sub-cycle and the mass flow dm1+dm2 through the bypass 13'. Other partitions of mass flows are possible, but not shown in FIG. 7 for purpose of simplicity.

The above described features of the embodiments in accordance with the present invention can be combined with each other and/or can be combined with prior art embodiments. For example, more than three sub-cycles can be used for the arrangement. Supercritical or normal fluids can be used as working fluid, such as oil, water, steam, or halogens. The sub-cycles can be used without recuperator, depending on the working fluid in use. Further components can be comprised by the cycle, such as further valves to control or regulate the fluid flow at special points of the cycle.

The main advantage of the disclosed embodiments of the invention is that the most expensive and largest component, i.e., the waste heat exchanger 3, is merged together into one, saving costs and space. The arrangement with substantially similar sub-cycles in series one after another downstream, and with substantially similar components within different sub-cycles, enables the utilization of high amounts of waste heat even at low temperatures in sub-cycles, slightly above room temperature, particularly by using $S-CO_2$ as the working fluid.

The absence of points in the layout splitting up the fluid flow in the upstream direction simplifies the design and simplifies the control or regulation requirements for the fluid flow. Separate coolers and pumps/compressors in every sub-cycle allow a better adjustment of temperature and flow rate of fluid within the sub-cycle and thus better control and regulation of the entire arrangement. A single flow path of working fluid further simplifies the design and control/regulation requirements. Additional bypass valves can be used to respond to variations of exhaust temperature and flow rate as to other environmental parameters. Downstream, sub-cycles can be turned off with bypass valves. To adjust working fluid flow rates according to components, additional bypasses can be used, bridging complete sub-cycles. This allows a fluid stream to be adjusted to cycle component dimensions. There are no upstream fluid nodes in accordance with disclosed embodiments of the present invention, splitting the fluid steam in upstream direction. All nodes like at points A, B in FIG. 6 and A, B, C in FIG. 7 are splitting up the fluid flow in downstream direction.

Figure 8:
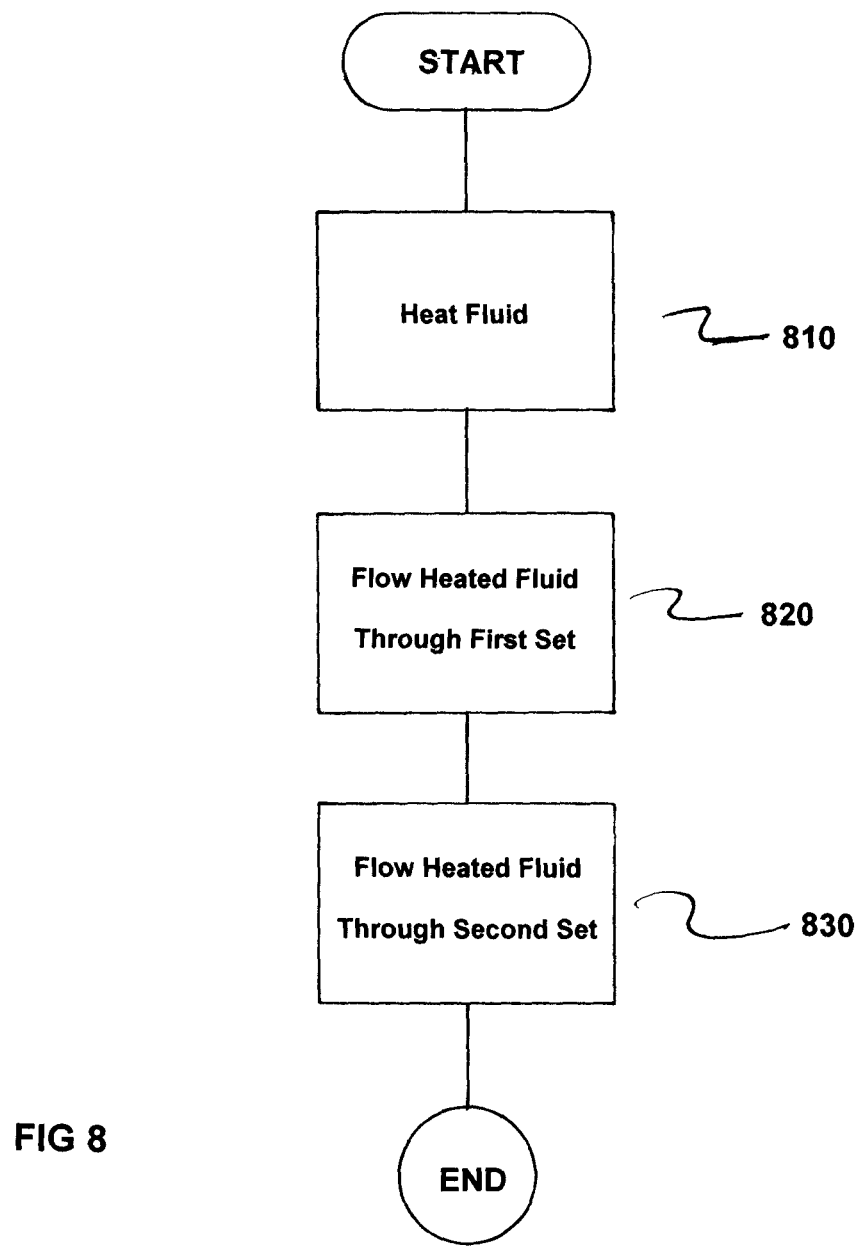
FIG. 8 is a flowchart of the method in accordance with the invention.

FIG. 8 is a flowchart of the method for utilizig waste heat in accordance with the invention. The method comprises heating up, by a waste heat exchanger (3), a fluid with heat from a waste heat source, as indicated in step 810.

Next, the heated fluid is caused to flow through a first set of at least one turbine (6), at least one recuperator (11), at least one cooler unit (8, 9), and at least one pump and/or compressor (10), as indicated in step 820.

The heated fluid is now caused to flow through at least a second set of at least one turbine (6'), at least one recuperator (11'), at least one cooler unit (8', 9'), and at least one pump and/or compressor (10'), arranged in series downstream of the first set of the at least one turbine (6), the at least one recuperator (11), the at least one cooler unit (8, 9), and the at least one pump and/or compressor (10), as indicated in step 830.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended for all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement for utilizing waste heat comprising:
   a waste heat exchanger;
   at least two turbines;
   at least two recuperators;
   at least two cooler units;
   at least two devices comprising at least one of (i) pumps and (ii) compressors; and
   a bypass valve directly connected to the waste heat exchanger, the at least two recuperators and a turbine of the at least two turbines;
   wherein all components of the arrangement are arranged in a single fluid cycle.

2. The arrangement according to claim 1, wherein the single fluid cycle comprises a closed fluid circuit.

3. The arrangement according to claim 1, wherein a respective turbine of the at least two turbines is respectively mechanically connected to at least one generator.

4. The arrangement according to claim 1, wherein the arrangement comprises a regenerative supercritical $CO_2$ system.

5. The arrangement according to claim 4, wherein the regenerative supercritical $CO_2$ system includes $CO_2$ as a working fluid within the single fluid cycle.

6. The arrangement according to claim 4, wherein the single fluid cycle comprises at least two open sub-cycles, respectively with one turbine of the at least two turbines, one recuperator of the at least two recuperators, one cooler unit of the at least two cooler units, and one of the pump and the compressor of the at least two devices comprising at least one of (i) pumps and (ii) compressors, all components of the arrangement being arranged in series.

7. The arrangement according to claim 6, further comprising:
   a bypass comprising a sub-cycle at every sub-cycle of the at least two open sub-cycles for optimal adjustment of mass flow within a sub-cycle.

8. The arrangement according to claim 6, further comprising:
   a further bypass valve directly fluidically connecting an inflow of a sub-cycle of the at least two open sub-cycles with an inflow of the waste heat exchanger.

9. The arrangement according to claim 1, wherein the single fluid cycle comprises at least two open sub-cycles, respectively with one turbine of the at least two turbines, one recuperator of the at least two recuperators, one cooler unit of the at least two cooler units, and one of the pump and the compressor of the at least two devices comprising at least one of (i) pumps and (ii) compressors, all components of the arrangement being arranged in series.

10. The arrangement according to claim 9, further comprising:
a bypass comprising a sub-cycle at every sub-cycle of the at least two open sub-cycles for optimal adjustment of mass flow within a sub-cycle.

11. The arrangement according to claim 9, further comprising:
a further bypass valve directly fluidically connecting an inflow of a sub-cycle of the at least two open sub-cycles with an inflow of the waste heat exchanger.

12. The arrangement according to claim 9, wherein the at least two open sub-cycles respectively comprise a regenerative supercritical $CO_2$ cycle for utilizing the waste heat.

13. The arrangement according to claim 12, further comprising:
a further bypass valve directly fluidically connecting an inflow of a sub-cycle of the at least two open sub-cycles with an inflow of the waste heat exchanger.

14. A method for utilizing waste heat, the method comprising:
heating up, by a waste heat exchanger, a fluid with heat from a waste heat source;
flowing the heated fluid through a first set of at least one turbine, at least one recuperator, at least one cooler unit, and at least one of (i) at least one pump and (ii) at least one compressor, a bypass valve being directly connected between the waste heat exchanger and the at least one turbine; and
flowing the heated fluid through at least a second set of at least one turbine, at least one recuperator, at least one cooler unit, and at least one of the (i) at least one pump and (ii) at least one compressor, arranged in series downstream of the first set of the at least one turbine, the at least one recuperator, the at least one cooler unit, and at least one of the (i) at least one pump and (ii) at least one compressor.

15. The method according to claim 14, wherein the flow of fluid through the second set downstream the first set is at least one of controlled and regulated by a bypass valve which fluidically connects an inflow of the second set downstream the first set and an inflow of the waste heat exchanger such that no fluid passes the second set downstream the first set.

16. The method according to claim 14, wherein a bypass fluidically connects an output of at least one of the (i) at least one pump and (ii) compressor of the first set with at least one of (A) the output of at least one of the (a) at least one pump and (ii) compressor of the second set and (B) an inflow of the waste heat exchanger, such that all outputs of one of the pumps and compressors are fluidically connected with an inflow of the waste heat exchanger.

17. The method according to any claim 14, wherein fluid heated by the waste heat exchanger flows in a closed fluid circuit through all fluidically connected components of the arrangement in series, except part of fluid flowing through a bypass.

18. The method according to claim 14, wherein one of:
the fluid comprises $CO_2$ in a supercritical state and is heated in the waste heat exchanger from a first temperature to a second temperature, transported to the at least one turbine of the first set and cooled down to a third temperature such that heat is partially converted into at least one of (i) mechanical energy and (ii) electrical energy, transported to the at least one turbine of the at least second set after being heated in the at least one recuperator, and further cooled down to a fourth temperature such that heat is partially converted into at least one of (i) mechanical energy and (ii) electrical energy, and
the fluid flows through a bypass of the second set.

19. The method according to claim 14, wherein the fluid flows through the first set with the same flow stream as through the at least second set.

20. The method according to claim 19, wherein the flow of fluid through the second set downstream the first set is at least one of controlled and regulated by a bypass valve which fluidically connects an inflow of the second set downstream the first set and an inflow of the waste heat exchanger such that no fluid passes the second set downstream the first set.

21. The method according to claim 14, wherein the fluid flows through the first set with the same flow stream as through the at least second set plus fluid flowing through a bypass.

22. The method according to claim 21, wherein the flow of fluid through the second set downstream the first set is at least one of controlled and regulated by a bypass valve which fluidically connects an inflow of the second set downstream the first set and an inflow of the waste heat exchanger such that no fluid passes the second set downstream the first set.

* * * * *